US012573209B2

(12) United States Patent
Hutchinson et al.

(10) Patent No.: US 12,573,209 B2
(45) Date of Patent: Mar. 10, 2026

(54) ROBUST INTERSECTION RIGHT-OF-WAY DETECTION USING ADDITIONAL FRAMES OF REFERENCE

(71) Applicant: TORC Robotics, Inc., Blacksburg, VA (US)

(72) Inventors: John Hutchinson, Blacksburg, VA (US); Indrajeet Kumar Mishra, Blacksburg, VA (US); Rasika Kangutkar, Blacksburg, VA (US); Scott Schlacter, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 348 days.

(21) Appl. No.: 18/311,612

(22) Filed: May 3, 2023

(65) Prior Publication Data

US 2024/0371178 A1 Nov. 7, 2024

(51) Int. Cl.
  *G06V 20/58* (2022.01)
  *G06V 10/764* (2022.01)
  *G08G 1/0967* (2006.01)
(52) U.S. Cl.
  CPC .......... *G06V 20/584* (2022.01); *G06V 10/764* (2022.01); *G06V 20/58* (2022.01); *G08G 1/096725* (2013.01)
(58) Field of Classification Search
  CPC .... G06V 20/584; G06V 20/58; G06V 10/764; G08G 1/095; G08G 1/096725
  See application file for complete search history.

(56) References Cited

U.S. PATENT DOCUMENTS

| | | | |
|---|---|---|---|
| 10,339,400 B1 | 7/2019 | Chai et al. | |
| 2015/0210277 A1* | 7/2015 | Ben Shalom .......... | G08G 1/167 |
| | | | 382/104 |

(Continued)

FOREIGN PATENT DOCUMENTS

| | | |
|---|---|---|
| CN | 111666894 A | 9/2020 |
| CN | 112289021 A | 1/2021 |

(Continued)

OTHER PUBLICATIONS

International Search Report and Written Opinion dated Aug. 12, 2024 for International Patent Application No. PCT/US2024/025244.

(Continued)

*Primary Examiner* — Shaghayegh Azima
(74) *Attorney, Agent, or Firm* — Armstrong Teasdale LLP

(57) ABSTRACT

Embodiments include systems and methods for determining states of traffic lights and managing behavior of an automated vehicle approaching an intersection. An autonomy system applies an object recognition engine trained to recognize a traffic light, and identify and confirm the state of the traffic light. A first neural network trained for object detection recognizes a traffic light and defines a bounding box around the recognized traffic light. A second neural network receives the region of the image bounded by the box as constituting the traffic light and "reads" the light. The automated vehicle uses other information, such as states of pedestrian traffic lights, detection of objects in and near the intersection, and glare on one or more cameras, to supplement its determination of the right of way through the intersection. The autonomy system generates a driving instruction based on the traffic light combined.

20 Claims, 10 Drawing Sheets

500

Receive, from at least two perception sensors (e.g., camera) of the automated vehicle, image data for imagery including one or more traffic lights 502

Detect a traffic light in the image data of at least two cameras by applying an object recognition engine on the image data received from each camera 504

Identify a state of the traffic light by applying a state detection engine on the image data received from each particular camera 506

Determine a number of matching states identified for the traffic light detected in the image data of each camera 508

Generate a driving instruction for the autonomous vehicle based upon the number of matching states identified for the traffic light from the at least two cameras 510

(56)     References Cited

U.S. PATENT DOCUMENTS

| | | | | |
|---|---|---|---|---|
| 2015/0329107 A1* | 11/2015 | Meyer | .................. | G08G 1/0133 |
| | | | | 701/28 |
| 2018/0112997 A1* | 4/2018 | Fasola | ................ | G01C 21/3407 |
| 2020/0094836 A1* | 3/2020 | Aoki | ..................... | B60W 10/04 |
| 2020/0410263 A1* | 12/2020 | Gao | ...................... | G01S 17/931 |
| 2022/0067406 A1* | 3/2022 | Hotson | ............... | G08G 1/0116 |

FOREIGN PATENT DOCUMENTS

| | | |
|---|---|---|
| DE | 102018109366 B4 | 1/2024 |
| EP | 3195190 B1 | 9/2020 |
| EP | 3851351 B1 | 11/2023 |

OTHER PUBLICATIONS

"Hidden Markov model", Retrieved from Internet: https://en.wikipedia.org/wiki/Hidden_Markov_model.

* cited by examiner

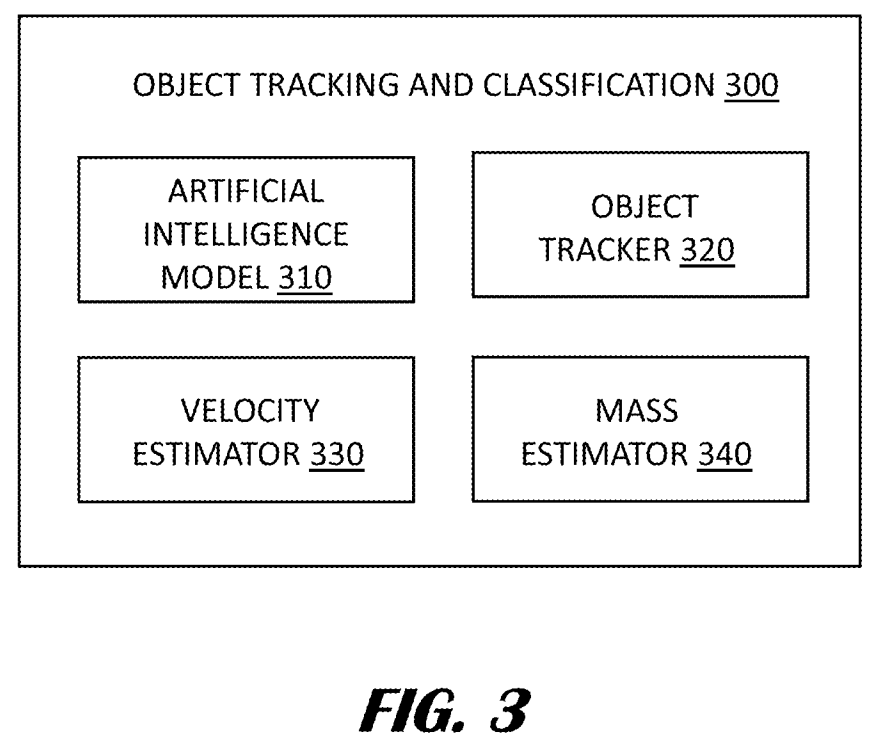

OBJECT TRACKING AND CLASSIFICATION 300

ARTIFICIAL INTELLIGENCE MODEL 310

OBJECT TRACKER 320

VELOCITY ESTIMATOR 330

MASS ESTIMATOR 340

FIG. 3

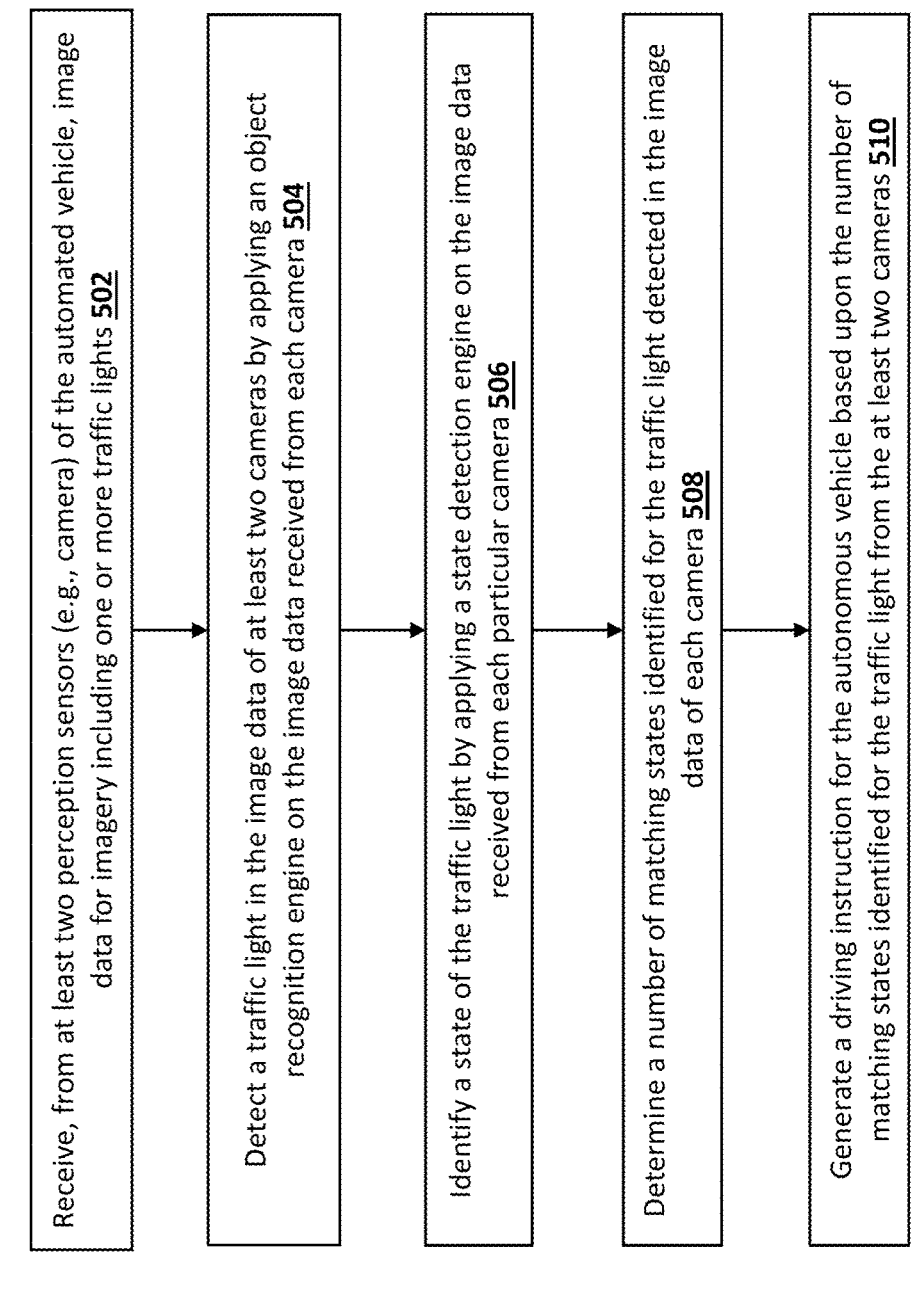

500

Receive, from at least two perception sensors (e.g., camera) of the automated vehicle, image data for imagery including one or more traffic lights 502

Detect a traffic light in the image data of at least two cameras by applying an object recognition engine on the image data received from each camera 504

Identify a state of the traffic light by applying a state detection engine on the image data received from each particular camera 506

Determine a number of matching states identified for the traffic light detected in the image data of each camera 508

Generate a driving instruction for the autonomous vehicle based upon the number of matching states identified for the traffic light from the at least two cameras 510

*FIG. 5*

ROBUST INTERSECTION RIGHT-OF-WAY DETECTION USING ADDITIONAL FRAMES OF REFERENCE

TECHNICAL FIELD

This application generally relates to managing operations of automated vehicles, including machine-learning architectures for determining driving behaviors according to computer vision and object recognition functions.

BACKGROUND

Vehicles must obey traffic lights in order to respect the right-of-way and navigate intersections safely. Automated vehicles often use cameras and vision algorithms to identify the relevant traffic light for the current travel lane and detect the current light state. Due to limitations in camera performance, obstructed or dirty lenses, processor hardware limitations, and algorithm design this detection can fail or give incorrect results.

One proposed solution is Vehicle-to-Infrastructure communication (V2I) in which the traffic light system directly communicates the light state to the vehicle. This method requires additional infrastructure complexity and expense and limits the areas an automated vehicle can operate to locations with V2I. Other solutions include camera lens cleaning devices, redundant cameras, or additional processing hardware, all of which add additional expense and complexity to the system.

SUMMARY

What is needed is an improved means for detecting traffic lights and identifying the state of traffic lights. What is further needed is an improved means for determining a driving action for the automated vehicle to perform using various data sources gathered at an intersection.

Described herein are systems and methods for improved detection of the state of traffic lights and determining appropriate operations of a vehicle subject to the traffic lights, such as determining when the vehicle receives the right-of-way and proceeds along the vehicle's path. A processor or other computing device detects a current state of one or more traffic lights, including the state of traffic signals (outside the current travel lane) present at the intersection in order to improve the reliability of the processor determining if it is safe and legal to proceed through the intersection. Embodiments may also allow the processor to predict upcoming changes to the light's state, which can help make smoother, safer decisions about stopping or proceeding through an intersection.

In an embodiment, a method for detecting traffic lights may comprise receiving, by a processor of an automated vehicle from at least two cameras of the automated vehicle, image data for imagery including one or more traffic lights; detecting, by the processor, a traffic light in the image data of the at least two cameras by applying an object recognition engine on the image data received from each camera; for each camera of the at least two cameras, identifying, by the processor applying a state detection engine, a state of the traffic light for the image data received from the particular camera; determining, by the processor, a number of matching states identified for the traffic light detected in the image data of each camera in the at least two cameras; and generating, by the processor, a driving instruction for the automated vehicle based upon the number of matching states identified for the traffic light from the at least two cameras.

In another embodiment, a method for detecting traffic lights may comprise receiving, by a processor of an automated vehicle from at least two cameras of the automated vehicle, image data for imagery including one or more traffic lights; detecting, by the processor, a traffic light in the image data of the at least two cameras by applying an object recognition engine on the image data received from each camera; for each camera of the at least two cameras, identifying, by the processor, a state of the traffic light by applying a state detection engine on the image data received from the particular camera; determining, by the processor, a number of matching states identified for the traffic light detected in the image data of each camera in the at least two cameras; in response to the states of the traffic light for the at least two cameras not matching, applying, by the processor, a weighting to the state of the traffic light identified for each camera; and generating, by the processor, an input to a vehicle control module for the automated vehicle based upon a weighted comparison of the states identified for the traffic light from the at least two cameras.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

FIG. 3 shows an object tracking and classification module of an autonomy system of an automated vehicle, according to an embodiment.

FIG. 5 is a flow diagram showing automated vehicle operations for a method of detecting traffic lights and determining driving behaviors based on a contemporaneous roadway environment, according to an embodiment.

DETAILED DESCRIPTION

Figure 1:
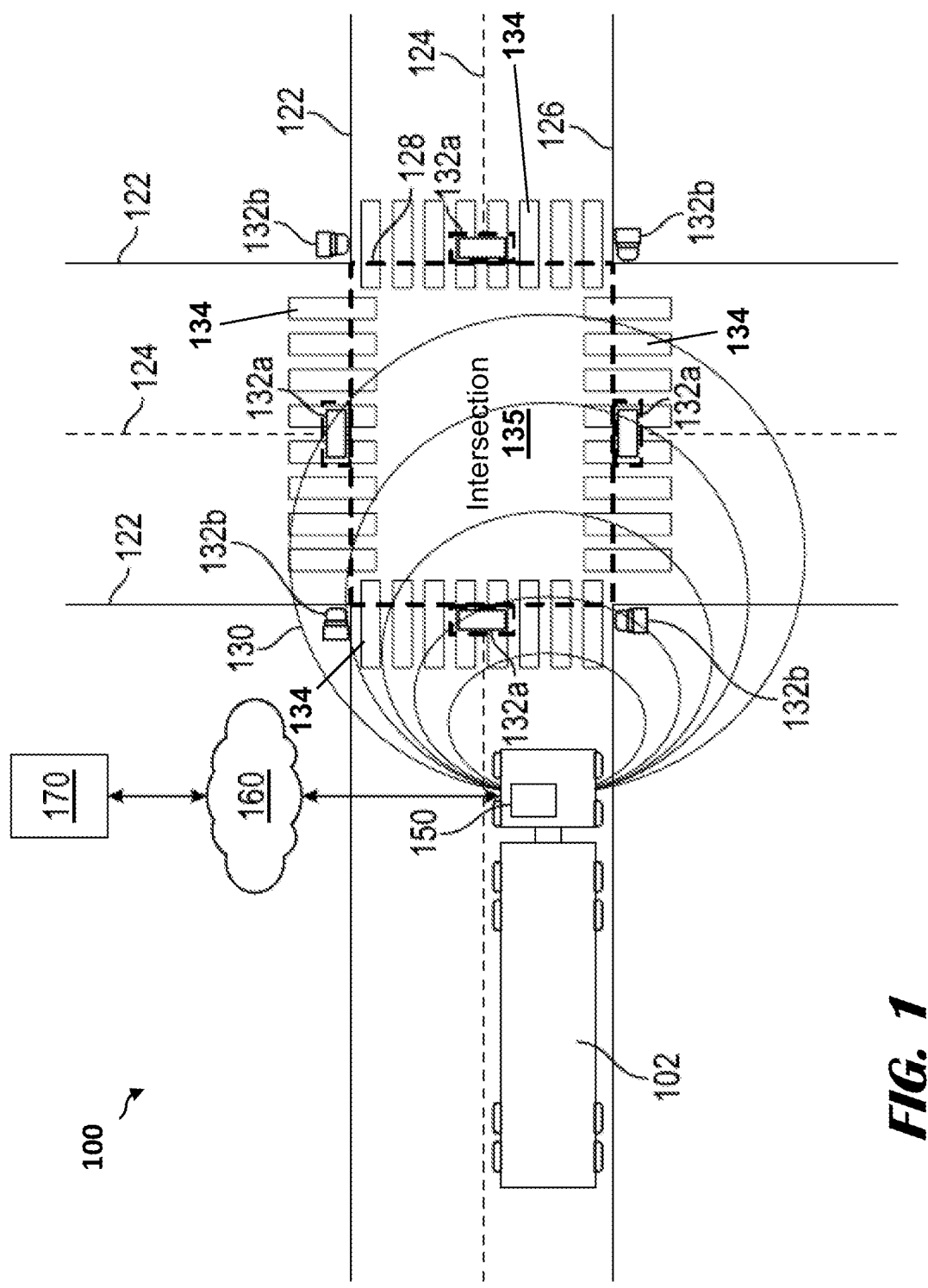
FIG. 1 shows a roadway environment, including various objects located at the roadway environment and characteristics of roads intersecting at the roadway environment, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein relate to automated vehicles having computer-driven automated driver systems (sometimes referred to as "autonomy systems"). The automated vehicle may be completely autonomous (fully-autonomous), such as self-driving, driverless, or SAE Level 4 autonomy, or semi-autonomous, such as SAE Level 3 autonomy. As used herein the terms "autonomous vehicle" and "automated vehicle" includes both fully-autonomous and semi-autonomous vehicles. The present disclosure sometimes refers to automated vehicles as "ego vehicles."

Generally, autonomy systems of automated vehicles are logically structured according to three pillars of technology: 1) perception; 2) maps/localization; and 3) behaviors, planning, and control.

The function of the perception aspect is to sense an environment surrounding the automated vehicle by gathering and interpreting sensor data. To interpret the surrounding environment, a perception module or engine in the autonomy system may identify and classify objects or groups of objects in the environment. For example, a perception module associated with various sensors (e.g., LiDAR, camera, radar, etc.) of the autonomy system may identify one or more objects (e.g., pedestrians, vehicles, debris, etc.) and features of a roadway (e.g., lane lines) around the automated vehicle, and classify the objects in the road distinctly.

The maps/localization aspect of the autonomy system determines where on a pre-established digital map the automated vehicle is currently located. One way to do this is to sense the environment surrounding the automated vehicle (e.g., via the perception system) and to correlate features of the sensed environment with details (e.g., digital representations of the features of the sensed environment) on the digital map. After the systems of the autonomy system have determined the location of the automated vehicle with respect to the digital map features (e.g., location on the roadway, upcoming intersections, road signs, etc.), the automated vehicle can plan and execute maneuvers and/or routes with respect to the features of the digital map.

The behaviors, planning, and control aspects of the autonomy system to make decisions about how an automated vehicle should move through the environment to get to a calculated goal or destination. For instance, the behaviors, planning, and control components of the autonomy system consumes information from the perception engine and the maps/localization modules to know where the ego vehicle is relative to the surrounding environment and what other traffic actors are doing. The behaviors, planning, and control components may be responsible for decision-making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools.

FIG. 1 shows a roadway environment 100, including various objects located at the roadway environment 100 and characteristics of roads intersecting at the roadway environment 100, according to an embodiment. The characteristics of the roads include an intersection 103, lane lines 122, 124, 126 and crosswalks 105 for pedestrians. The objects include an automated vehicle 102 (sometimes referred to as an "ego" or "ego vehicle"), shown as an autonomous truck 102 approaching the intersection 103; and vehicle traffic lights 132a and pedestrian traffic lights 132b (generally referred to as "traffic lights 132") situated around the intersection 103.

Further, FIG. 1 displays aspects of an autonomy system 150 of the autonomous truck 102 that captures various types of information about the environment 100 and generates driving instructions for the autonomous truck 102. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. While this disclosure refers to a truck 102 (e.g., tractor trailer) as the automated vehicle, it is understood that the automated vehicle could be any type of vehicle including an automobile, a mobile industrial machine, or the like. While the disclosure will discuss a self-driving or driverless autonomous system, it is understood that the autonomous system could alternatively be semi-autonomous having varying degrees of autonomy or autonomous functionality. In some embodiments, various types of data or software components of the autonomy system may be stored or executed by the remote server 170, which the remote 170 reports back to the autonomy system 150 of the truck 102 via the network 160.

As mentioned, the autonomy system 150 includes hardware and software components logically arranged into several types of logical components, including: (1) perception components; (2) maps and localization components ("localization components"); and (3) behavior, planning, and control components ("behavior components").

The function of the perception components is to sense features of the roadway environment 100 surrounding truck 102 and interpret information related to the features. To interpret the surrounding roadway environment 100, a perception engine in the autonomy system 150 of the autonomous truck 102 may identify and classify objects or groups of objects in the roadway environment 100. For example, a perception engine associated with various sensors (e.g., LiDAR, camera, radar, etc.) of the autonomy system 150 may identify one or more objects (e.g., pedestrians, vehicles, debris, etc.) and features of the roadway (e.g., lane lines 122, 124), and classify the objects and roadway features. As shown in FIG. 1, the perception components of the autonomous truck 102 capture information about the roadway environment 100 with a perception radius 130.

The maps and localization components of the autonomy system 150 may be configured to determine where on a pre-established digital map the truck 102 is currently located. In some cases, maps and localization components sense the environment 100 surrounding the truck 102 (e.g., via the perception system) and correlate features of the sensed environment 100 with details (e.g., digital representations of the features of the sensed environment) on the digital map.

After the autonomy system 150 of the truck 102 determines the truck's 102 location with respect to the digital map features (e.g., location on the roadway, upcoming intersections intersection 103, traffic lights 132), the autonomy system 150 of the autonomous truck 102 plans and executes maneuvers and/or routes with respect to the features of the digital map. The behaviors, planning, and control components of the autonomy system 150 may be configured to make decisions about how the truck 102 should move through the environment 100 to get to a goal or destination.

The behaviors, planning, and control components may consume information from the perception and maps/localization modules to determine where the autonomous truck 102 is located relative to the aspects of the surrounding environment roadway environment 100.

As shown in FIG. 1, the perception components (or perception systems) aboard the truck 102 may help the truck 102 perceive the environment 100 out to a perception radius 130. The actions of the truck 102 may depend on the extent of perception radius 130. The autonomy system 150 may include perception components or subsystems for managing operations of various perception sensors, including ingesting and processing sensor data inputs gathered and generated by the various sensors. The perception sensors and perception systems include, for example, a camera system for one or more cameras, a LiDAR system for one or more LiDAR sensors, a radar system for one or more radar sensors, a GNSS receiver and geolocation (e.g., GPS) system, and an inertial measurement unit (IMU) for inertial measurement sensors (e.g., gyroscope, accelerometer), among other types of perception sensors.

As mentioned, the perception components of the truck 102 include, for example, one or more cameras (not shown) mounted around the truck 102 and coupled to the autonomy system 150. The cameras capture imagery of the roadway environment 100 surrounding the truck 102 within the cameras' field-of-view (e.g., perception radius 130) and generate image data for the imagery. The camera sends the image data generated to the perception module of the autonomy system 150. In some embodiments, the autonomy system 150 transmits the image data generated by the cameras to the remote server 170 for additional processing.

The perception module of the autonomy system 150 may receive input sensor data from the various sensors, such as the one or more cameras, LiDARs, GNSS receiver, and/or IMU (collectively "perception data") to sense the environment 100 surrounding the truck 102 and interpret or recognize objects and roadway features in the environment 100. To interpret the surrounding environment, the perception module (or "perception engine") of the autonomy system 150 may identify and classify objects, features, characteristics of objects, or groups of objects in the environment 100. For instance, the truck 102 may use the perception module to identify one or more objects (e.g., pedestrians, vehicles, debris, etc.) or features of the roadway (e.g., intersections, road signs, traffic lights 132, lane lines 122, 124, 126) before or beside the truck 102 and classify the objects or road features in the environment 100. The perception module of the autonomy system 150 may include software components for performing an image classification function and/or a computer vision function. In some implementations, the perception module of the autonomy system 150 may include, communicate with, or otherwise execute software for performing object tracking and/or object classification functions allowing the autonomy system 150 to perform object detection and classification operations.

As an example, as the truck 102 approaches an intersection 135, the perception module of the autonomy system 150 receives image data from the cameras (or other perception sensors), capturing imagery of roadway features, such as the traffic lights 132, crosswalks, and lane lines 122, 124, 126. The autonomy system 150 executes the object recognition and classification functions to identify and classify these roadway features. When the object classification function detects a particular traffic light 132, the autonomy system 150 executes additional software components for classifying the status of the traffic light 132 (e.g., red, yellow, green).

The autonomy system 150 then determines further driving operations according to the status of the traffic light (e.g., stop, slow down, continue), as well as other inputted information.

The autonomy system 150 may receive and collect perception data (or sensor input data) from the various perception sensors of the truck 102. The perception data may represent the perceived environment 100 surrounding the truck 102, for example, and may be collected using aspects of the perception system described herein. The perception data can come from, for example, one or more of the LiDAR system, the camera system, and various other externally-facing sensors and systems on board the truck 102 (e.g., the GNSS receiver). For example, where the truck 102 includes a sonar or radar system, the sonar and/or radar systems may collect those types of perception data. As the truck 102 travels along the roadway, the autonomy system 150 may continually receive perception data from the various perception systems on the truck 102. The autonomy system 150 may receive, collect, and analyze the perception data periodically and/or continuously.

In some cases, the autonomy system 150 may compare the collected perception data with stored data. The system may identify and classify various features detected in the collected perception data from the environment 100 against the features stored in a digital map. For example, the detection systems may detect the lane lines 122, 124, 126 by comparing the detected lane lines 122, 124, 126 against pre-stored information about lane lines stored in a digital map. Additionally, the detection systems could detect roadway features, such as the traffic lights 132 and crosswalks 134, by comparing such roadway features against pre-stored roadway features in the digital map. The roadway features may be stored as points (e.g., signs, small landmarks), road boundaries (e.g., lane lines 122, 124, 126, road edges), or polygons (e.g., lakes, large landmarks) and may have various properties (e.g., style, visible range, refresh rate). The roadway features may control how the autonomy system 150 interacts with the various aspects of the environment 100. In some embodiments, based on the comparison of the detected features against the known features stored in the digital map(s), the autonomy system 150 may generate a confidence level, representing a confidence of the truck 102 location with respect to the features on the digital map. The autonomy system 150 references the confidence level to confirm the actual location of the truck 102.

Figure 2:
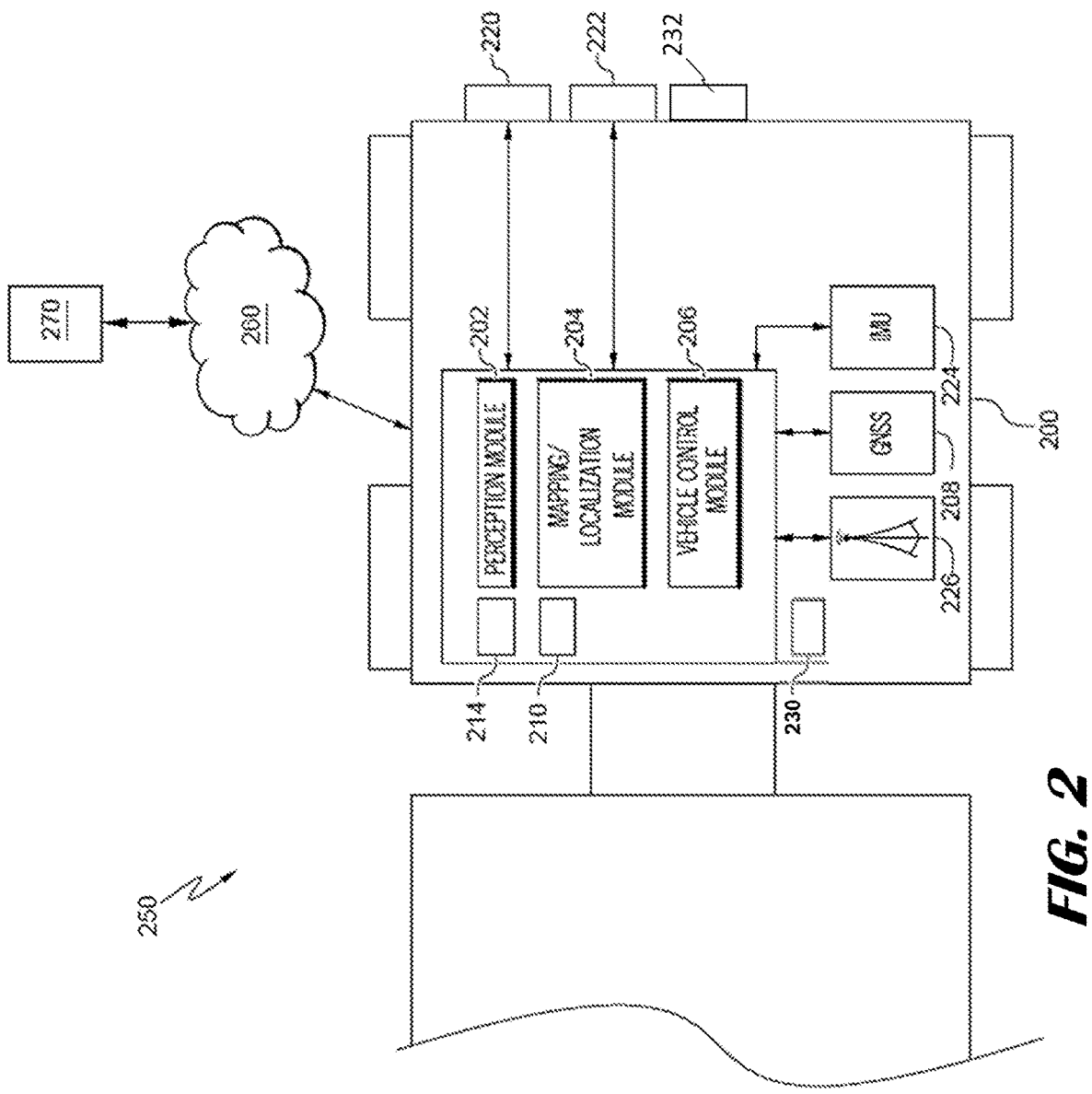
FIG. 2 shows example components of an autonomy system on board an automated vehicle, according to an embodiment

FIG. 2 shows example components of an autonomy system 250 on board an automated vehicle, such as an automated truck 200 (e.g., automated truck 102), according to an embodiment. The autonomy system 250 may include a perception system comprises hardware and software components for the vehicle system 200 to perceive an environment (e.g., environment 100). The components of the perception system include, for example, a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include additional, fewer, or different components or systems. Similarly, each of the components or system(s) may include additional, fewer, or different components. Additionally, the systems and components shown may be combined or divided in various ways.

The perception systems of the autonomy system 250 may help the truck 200 perceive the environment and perform various actions.

The camera system 220 of the perception system may include one or more cameras mounted at any location on the truck 200, which may be configured to capture images of the environment surrounding the truck 200 in any aspect or field of view (FOV) (e.g., perception field 130). The FOV can have any angle or aspect such that images of the areas ahead of, to the side, and behind the truck 200 may be captured. In some embodiments, the FOV may be limited to particular areas around the truck 200 (e.g., forward of the truck 200) or may surround 360 degrees of the truck 200. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information) generated by the object tracking and classification module 230, can be transmitted to the remote server 270 for additional processing (e.g., correction of detected misclassifications from the image data, training of artificial intelligence models).

The LiDAR system 222 may include a laser generator and a detector and can send and receive a LIDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g). In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 includes any non-transitory machine-readable storage medium that stores data and/or software routines that assist the autonomy system 250 in performing various functions, such as the functions of the perception module 202, the mapping/localization module 204, the vehicle control module 206, or an object tracking and classification module 230, among other functions of the autonomy system 250. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, etc.) or features of the roadway (e.g., intersections, road signs, lane lines) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 250 may collect perception data. The perception data may represent the perceived environment surrounding the truck 200, for example, and may be collected using aspects of the perception system described herein. The perception data can come from, for example, one or more of the LiDAR system, the camera system, and various other externally-facing sensors and systems on board the truck 200 (e.g., GNSS 208 receiver). For example, on vehicles having a sonar or radar system, the sonar and/or radar systems may collect perception data. As the truck 200 travels along the roadway, the system 250 may continually receive data from the various systems on the truck 200. In some embodiments, the system 250 may receive data periodically and/or continuously.

The system 250 may compare the collected perception data with stored data. For instance, the system 250 may identify and classify various features detected in the collected perception data from the environment with the features stored in a digital map. For example, the detection systems of the system 250 may detect the lane lines and may compare the detected lane lines with lane lines stored in a digital map. Additionally, the detection systems of the system 250 could detect the traffic lights by comparing such features with features in a digital map. The features may be stored as points (e.g., signs, small landmarks), lines (e.g., lane lines, road edges), or polygons (e.g., lakes, large landmarks) and may have various properties (e.g., style, visible range, refresh rate, etc.), where such properties may control how the system 250 interacts with the various features. In some embodiments, based on the comparison of the detected features against the features stored in the digital map(s), the system 250 may generate a confidence level, which may represent a confidence in the calculated location of the truck 200 with respect to the features on a digital map and hence, the actual location truck 200 as determined by the system 250.

The image classification function may determine the features of an image (e.g., visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). The computer vision function may be embodied by a software module (e.g., the object detection and classification module 230) that may be communicatively coupled to a repository of images or image data (e.g., visual data; point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard automated vehicle, or another vehicle, can run a route several times and collect the location of all targeted map features relative to the position of the truck 200 conducting the map generation and correlation. These repeated observations can be averaged together in a known way to produce a highly accurate, high-fidelity digital map. This generated digital map can be provided to each truck 200 (e.g., from a remote server 270 via a network 260 to the truck 200) before the truck 200 departs on a mission so the truck 200 can carry the digital onboard and use the digital map data within the mapping/localization module 204. Hence, the truck 200 and other vehicles (e.g., a fleet of trucks similar to the truck 200) can generate, maintain (e.g., update), and use a particular instance of each truck's 200 generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines) the truck may use the truck 200 control module 206 and its associated systems to plan and execute maneuvers and/or routes with respect to the features of the environment. The vehicle control module 206 may make decisions about how the truck 200 will move through the environment to get to a goal or destination as the truck 200 completes the mission. The vehicle control module 206 may consume information from the perception module 202 and the maps/localization module 204 to know where the truck 200 is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system). The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

FIG. 3 shows an object tracking and classification module 300 of an autonomy system (e.g., autonomy system 150, 250) of an automated vehicle (e.g., truck 102, 200), according to an embodiment. The object tracking and classification module 300 includes an artificial intelligence model 310, object tracker 320, velocity estimator 330, and effective mass estimator 340. These components of the object detecting and tracking module 300 may be either or both software-based components and hardware-based components. In some embodiments, one or more various types of data or software components of the object tracking and classification module 300 may be stored and executed by a remote server (e.g., remote server 170, 270).

In an embodiment, the object tracking and classification module 300 executes the artificial intelligence model 310 to detect and classify objects in sequences of images captured by at least one sensor (e.g., a camera; a video camera; video streaming device) of the automated vehicle. In some implementations, the artificial intelligence model 310 can be executed in response to receiving an image from at least one sensor of the automated vehicle. The artificial intelligence model 310 can be or may include one or more neural networks. The artificial intelligence model 310 can be a single shot multi-box detector, and can process an entire input image in one forward pass. Processing the entire input image in one forward pass improves processing efficiency, and enables the artificial intelligence model 310 to be utilized for real-time or near real-time autonomous driving tasks.

In some embodiments, the input to the artificial intelligence model 310 may be pre-processed, or the artificial intelligence model 310 itself may perform additional processing on the input data. For example, an input image to the artificial intelligence model 310 can be divided into a grid of cells of a configurable (e.g., based on the architecture of the artificial intelligence model 310) size. The artificial intelligence model 310 can generate a respective prediction (e.g., classification, object location, object size/bounding box) for each cell extracted from the input image. As such, each cell can correspond to a respective prediction, presence, and location of an object within its respective area of the input image. The artificial intelligence model 310 may also generate one or more respective confidence values indicating a level of confidence that the predictions are correct. If an object represented in the image spans multiple cells, the cell with the highest prediction confidence can be utilized to detect the object. The artificial intelligence model 310 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions.

The artificial intelligence model 310 may be or may include a deep convolutional neural network (CNN) or other machine-learning techniques, which may include one or more layers of a machine-learning architecture that implements machine-learning functionality. The one or more layers can include, in a non-limiting example, convolutional layers, max-pooling layers, activation layers and fully connected layers, among others. Convolutional layers can extract features from the input image (or input cell) using convolution operations. The convolutional layers can be followed, for example, by activation functions (e.g., a rectified linear activation unit (ReLU) activation function, exponential linear unit (ELU) activation function), model. The convolutional layers can be trained to process a hierarchical representation of the input image, where lower level features are combined to form higher-level features that may be utilized by subsequent layers in the artificial intelligence model 310.

The artificial intelligence model 310 may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the artificial intelligence model 310. The artificial intelligence model 310 may include multiple sets of convolutional layers followed by a max-pooling layer, with the max-pooling layer providing its output to the next set of convolutional layers in the artificial intelligence model. The artificial intelligence model 310 can include one or more fully connected layers, which may receive the output of one or more max-pooling layers, for example, and generate predictions as described herein. A fully connected layer may include multiple neurons, which perform a dot product between the input to the layer and a set of trainable weights, followed by an activation function. Each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input image.

The artificial intelligence model 310 may include or may utilize one or more anchor boxes to improve the accuracy of its predictions. Anchor boxes can include predetermined boxes with different aspect ratios that are used as references for final object detection predictions. The artificial intelligence model 310 can utilize anchor boxes to ensure that the bounding boxes it outputs have the correct aspect ratios for the objects they are detecting. The predetermined anchor boxes may be pre-defined or selected based on prior knowledge of the aspect ratios of objects that the model will encounter in the images captured by the sensors of automated vehicles. The size and aspect ratios of anchor boxes can be determined based on statistical analysis of the aspect ratios of objects in a training dataset, for example. The anchor boxes may remain fixed in size and aspect ratio during both training and inference, and may be chosen to be representative of the objects in the target dataset.

The artificial intelligence model 310 may be trained at one or more remote servers using any suitable machine-learning training technique, including supervised learning, semi-supervised learning, self-supervised learning, or unsupervised learning, among other techniques. In an example training process, the artificial intelligence model 310 can be trained using a set of training data that includes images of objects and corresponding ground truth data specifying the bounding boxes and classifications for those objects. The images used in the training data may be received from automated vehicles described herein, and the ground-truth values may be user-generated through observations and experience to facilitate supervised learning. In some embodiments, the training data may be pre-processed via any suitable data augmentation approach (e.g., normalization, encoding, any combination thereof) to produce a new dataset with modified properties to improve model generalization using ground truth.

The object tracker 320 may track objects detected in the sequences of images by the artificial intelligence model 310. The object tracker 320 may perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). To do so, the object tracker 320 may execute a discriminative correlation filter tracker with channel and spatial reliability of tracker (CSRT) to predict a position and size of a bounding box in a second image given a first image (and corresponding bounding box) as input. In some embodiments, the object tracker 320 may utilize alternative tracking algorithms, including but not limiting to Boosting, Multiple Instance Learning (MIL), or Kernelized Correlation Filter (KCF), among others.

The object tracker 320 can determine that an object has been detected in a first image of a sequence of images captured by the sensors of the automated vehicle. If the object has not appeared in any previous images (e.g., a tracking process has failed to associate the object with a previously tracked object in previous images), the object tracker 320 can generate a tracking identifier for the object, and begin a new tracking process for the object in the first image and subsequent images in the sequence of images. The object tracker 320 can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. In each subsequent incoming image (e.g., as is it captured, or as the object tracker 320 iterates through a previously captured sequence of images, etc.), the object tracker 320 can output the predicted position and size of a bounding box for the object in the subsequent image, and compare the predicted bounding box with the actual bounding box (e.g., generated by the artificial intelligence model 310) in the subsequent image.

The object tracker 320 can associate the newly detected object with the generated tracking identifier if the Intersection Over Union (IOU) of the predicted bounding box and the actual bounding box is greater than a predetermined value. The object tracker 320 can calculate the IOU as the ratio of the area of the intersection of two bounding boxes to the area of their union. To calculate the IOU, the object tracker 320 can determine the coordinates of the top-left and bottom-right corners of the overlapping region between the two bounding boxes (e.g., by subtracting determined coordinates of each bounding box). Then, the object tracker 320 can calculate the width and height of the overlap and utilize the width and height to calculate the area of the overlap. The object tracker 320 can calculate the area of union as the sum of the areas of the two bounding boxes minus the area of their overlap, and then calculate the IOU as the ratio of the area of intersection to the area of the union.

In some implementations, the object tracker 320 can utilize the Kuhn-Munkres algorithm to perform matching of bounding boxes to existing tracking identifiers. The Kuhn-Munkres algorithm can be utilized to find the optimal assignment between the predicted bounding boxes and the detected bounding boxes that minimizes the sum of the costs (or maximizes the negation of the costs) associated with each assignment. The cost of an assignment may be for example, the IOU between the bounding boxes, or in some implementations, the Euclidean distance between the centers of the bounding boxes. When executing the Kuhn-Munkres algorithm, the object tracker 320 can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The object tracker 320 can determine the optimal assignment (e.g., the tracking identifier to associate with the detected bounding boxes) by optimizing for the maximum sum of the negation of the cost matrix for the pairs of bounding boxes (e.g., a maximum weight matching for the weighted bipartite graph).

In some implementations, the object tracker 320 can execute the Kuhn-Munkres algorithm to determine the best matching pairs within the bipartite graph. To do so, the object tracker 320 can assign each node in the bipartite graph a value that represents the best case of matching in the bipartite graph. For any two connected nodes in the bipartite graph, that the assigned value of two nodes is larger or equal to the edge weight. In this example, each node in the bipartite graph represents a predicted bounding box or a detected bounding box, and the predicting bounding boxes can only match to the detected bounding boxes, or vice versa. In some implementations, the values can be assigned to each of the nodes representing predicted bounding boxes, and the node value of the nodes in the bipartite graph that represent detected bounding boxes can be assigned to a node value of zero.

When executing the Kuhn-Munkres algorithm, the object tracker 320 can continuously iterate through each of the nodes in the bipartite graph determined for the cost matrix to identify an augmenting path starting from unmatched edges at the node and ending in another unmatched edge. The object tracker 320 can take the negation of the augmenting path, to identify one or more matching nodes. In some cases, when executing the Kuhn-Munkres algorithm, the object tracker 320 may be unable to resolve a perfect match through negation of the augmenting path. For the unsuccessful augmenting path, the object tracker 320 can identify all the related nodes (e.g., nodes corresponding to predicted bounding boxes) and calculate a minimum amount by which to decrease their respective node value to match with their second candidate (e.g., a node representing a corresponding detected bounding box). In order to keep the sum of linked nodes the same, the amount by which the node values are increased can be added to nodes to which said nodes are matched. In some implementations, the Kuhn-Munkres algorithm can be executed when the number of predicted bounding boxes and the number of detected bounding boxes is the same. If the number of predicted bounding boxes and the number of detected bounding boxes is different, the object tracker 320 can generate placeholder data representing fake bounding boxes to satisfy the requirements of the Kuhn-Munkres algorithm.

In some implementations, the object tracker 320 can implement an occlusion strategy, which handles cases where tracking fails for two or more consecutive images. One occlusion strategy is to delete or remove the tracking identifier when an object fails to appear (or be correctly tracked) in a subsequent image in the sequence of images. Another occlusion strategy is to only delete the tracking identifier if an object has failed to be tracked for a predetermined number of images (e.g., two consecutive images, five consecutive images, ten consecutive images). This can enable the object tracker 320 to correctly detect and track objects even in cases where the artificial intelligence model 310 fails to detect an object that is present in the sequence of images for one or more consecutive images. The object tracker 320 may also execute one or more of the operations described in connection with embodiments for determining a correction to a classification of objects detected in the sequence of images.

Velocity estimator 330 may determine the relative velocity of target objects relative to the ego vehicle. Effective mass estimator 340 may estimate effective mass of target objects, e.g., based on object visual parameters signals from an object visual parameters component and object classification signals from a target object classification component. The object visual parameters component may determine visual parameters of a target object such as size, shape, visual cues and other visual features in response to visual sensor signals, and generates an object visual parameters signal. The target object classification component may determine a classification of a target object using information contained within the object visual parameters signal, which may be correlated to various objects, and generates an object classification signal. For instance, the target object classification component can determine whether the target object is a plastic traffic cone or an animal.

In some implementations, the object tracking and classification module 300 may include a cost analysis function module. The cost analysis function module may receive inputs from other components of object tracking and classification module 300 and generates a collision-aware cost function. The autonomy system may apply this collision-aware cost function in conjunction with other functions used in path planning. In an embodiment, the cost analysis function module provides a cost map that yields a path that has appropriate margins between the automated vehicle and surrounding target objects.

Objects that may be detected and analyzed by the object tracking and classification module 300 include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily static objects such as parked cars. Externally-facing sensors may provide the autonomy system (and the object tracking and classification module 300) with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

Figure 4:
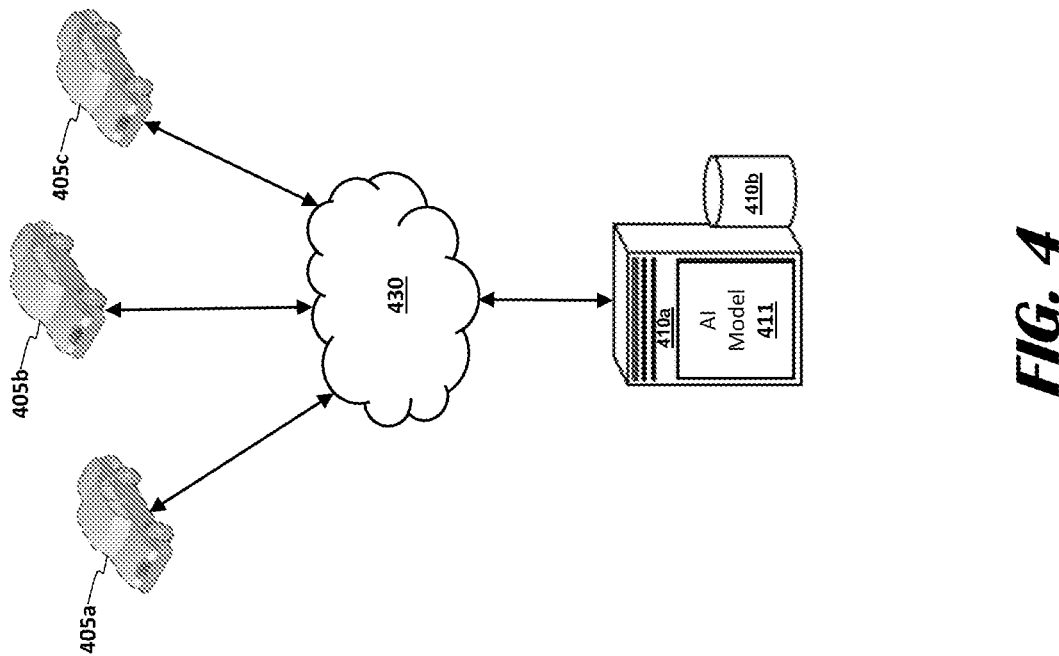
FIG. 4 illustrates components of a system for training artificial intelligence models with improved accuracy using image data, according to an embodiment.

FIG. 4 illustrates components a system 400 for training artificial intelligence models 411 with improved accuracy using image data, according to an embodiment. The system 400 may include a remote server 410a, system database 410b, artificial intelligence models 411, and automated vehicles 405a-405c (generally referred to as "automated vehicles 405" or an "automated vehicle 405").

Various components depicted in FIG. 4 may be implemented to receive and process images captured by the automated vehicles 405 to train the artificial intelligence models 411, which can subsequently be deployed to the automated vehicles 405 to assist with autonomous navigation processes. The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums. In some embodiments, the system 400 may include one or more administrative computing devices (not shown) that may be utilized to communicate with and configure various settings, parameters, or controls of the system 400.

The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The automated vehicles 405 may include one or more sensors, communication interfaces or devices, and autonomy systems (e.g., autonomy system 150, 250). The autonomy system of the automated vehicle 405 may include an object detection and tracking module (e.g., object detection and tracking module 300 of FIG. 3). Each automated vehicle 405 can transmit sensor data and any data generated or processed by the autonomy system of the automated vehicle 405 to the remote server 410a. The automated vehicles 405 may transmit the information as the automated vehicle 405 operates, or after the automated vehicle 405 has ceased operation (e.g., parked, connected to a predetermined wireless or wired network).

The remote server 410a may receive sequences of images captured during operation of the automated vehicles 405, and perform the correction techniques described herein to generate data for training the artificial intelligence models 411. In some embodiments, the remote server 410a can include, or implement any of the functionality of, an object detection and tracking module. For example, the remote server 410a may receive sequences of images received from the automated vehicles 405a, and store the sequences of images in a system database 410b. The remote server 410a can store the sequences of images in association with metadata received from or generated based on communications with the automated vehicles 405. The metadata may include, for example, an identifier of automated vehicle 405, a timestamp corresponding to one or of the images or the sequence of images, bounding boxes detected by the autonomy system of the automated vehicle 405, classifications determined by the autonomy system of the automated vehicle 405, tracking identifiers corresponding to detected bounding boxes, distance information for detected objects in the sequences of images, any sensor data described herein, among other metadata.

The remote server 410a can implement the functionality described in connection with determining one or more corrections to classifications generated by the automated vehicles 405. The corrections can be utilized as additional ground truth data for training the artificial intelligence model 411, which can be generated by the remote server 410a and stored in the system database 410b. The corrections can be determined, as described herein, by utilizing tracking information (e.g., the tracking identifiers and the bounding boxes to which they correspond) associated with objects depicted in sequences of images. In some circumstances, the remote server 410a can determine that a classification of a tracked object in an image does not match other classifications within the sequence of images. The remote server 410a can perform a voting algorithm using the classifications corresponding to the detected object in each image of a sequence of images in which the object was detected and tracked (e.g., associated with a common tracking identifier).

In some implementations, the remote server 410a can utilize a majority-voting algorithm, in which the classification that occurs most common in the corresponding images is chosen as the corrected classification. In some implementations, the remote server 410a can utilize a normalized weighted voting algorithm. When executing the normalized weighted voting algorithm, the remote server 410a can divide the instances in which the object was detected in the sequence of images groups according to the distance of the object from the automated vehicle 405 that captured the sequence of images. The autonomy system of the automated vehicle 405 or the remote server 410a may determine a distance based sensor data captured by the sensors of the automated vehicle 405. The remote server 410a can determine a weight value for each group, corresponding to the classification accuracy at different predetermined distances, for example. The remote server 410a can determine a candidate class label based on confidence values (e.g., generated by the artificial intelligence model that detected the bounding box in the sequence of images) associated with the detected bounding box or classification. The remote server 410a can determine a weight value for the candidate class label of each group based on a distance coefficient for the respective group. The remote server 410a can calculate the weighted sum of class confidence to determine the voted class label among the groups. In an embodiment, the distance coefficient is a hyper-parameter, which can be tuned according to the classification performance of the various artificial intelligence models 411 described herein (e.g., artificial intelligence model 310) at different distance ranges.

In some implementations, the remote server 410a can detect one or more images in a consecutive sequence of images in which detection of an object (e.g., generation of an accurate bounding box) has failed. For example, the remote server 410a can iterate through a sequence of images and identify whether bounding boxes corresponding to a common tracking identifier appear in consecutive images. If an image between two images is missing a bounding box for the common tracking identifier of an object, the remote server 410a can determine that the respective bounding box is missing. The remote server 410a can generate a corrected bounding box by estimating the position and size of the bounding box for the image. To do so, the remote server 410a can execute the CSRT tracking algorithm to estimate the position and position and size of a bounding box for the object in the image given the previous image in the sequence in which the object was correctly detected.

The artificial intelligence models 411 may be stored in the system database 410b and may include artificial intelligence models that can detect and classify objects and images. In some implementations, the artificial intelligence models 411 may be generated or trained for on different types of cameras, automated vehicles 405, or environments. For example, the artificial intelligence models 411 may include multiple artificial intelligence models, each of which may be trained for a specific type of automated vehicle 405, a specific set of sensors deployed on an automated vehicle 405, or a particular environment in which one or more automated vehicles 405 may be deployed. One or more of the artificial intelligence models 411 may be derived from a similar base model, which may be fine-tuned for particular applications.

The artificial intelligence models 411 can be or may include one or more neural networks. The artificial intelligence models 411 can be a single shot multi-box detector, and can process an entire input image in one forward pass. Processing the entire input image in one forward pass improves processing efficiency, and enables the artificial intelligence models 411 to be utilized for real-time or near real-time autonomous driving tasks. In some embodiments, the input to the artificial intelligence models 411 may be pre-processed, or the artificial intelligence models 411 itself may perform additional processing on the input data. For example, an input image to the artificial intelligence models 411 can be divided into a grid of cells of a configurable size (e.g., based on the architecture of the artificial intelligence models 411). The artificial intelligence models 411 can generate a respective prediction (e.g., classification, object location, object size, bounding box) for each cell extracted from the input image. As such, each cell can correspond to a respective prediction, presence, and location of an object within its respective area of the input image.

The artificial intelligence models 411 may also generate one or more respective confidence values indicating a level of confidence that the predictions are correct. If an object represented in the image spans multiple cells, the cell with the highest prediction confidence can be utilized to detect the object. The artificial intelligence models 411 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions. The artificial intelligence models 411 may be or may include a deep CNN, which may include one or more layers that may implement machine-learning functionality. The one or more layers can include, in a non-limiting example, convolutional layers, max-pooling layers, activation layers and fully connected layers, among others.

The remote server 410a can train one or more of the artificial intelligence models 411 using training data stored in the system database 410b. In an example training process, the artificial intelligence models 411 can be trained using a set of training data that includes images of objects and corresponding ground truth data specifying the bounding boxes and classifications for those objects. The images used in the training data may be received from the automated vehicles 405, and the ground-truth values may be user-generated through observations and experience to facilitate supervised learning. In some embodiments, at least a portion of the ground truth data can be generated by the remote server 410a using the correction techniques described herein. In some embodiments, the training data may be pre-processed via any suitable data augmentation approach (e.g., normalization, encoding, any combination thereof) to produce a dataset with modified properties to improve model generalization using the ground truth.

The remote server 410a can train an artificial intelligence model 411, for example, by performing supervised learning techniques to adjust the parameters of the artificial intelligence model 411 based on a loss computed from the output generated by the artificial intelligence model 411 and ground truth data corresponding to the input provided to the artificial intelligence model 411. Inputs to the artificial intelligence model 411 may include images or sequences of images captured during operation of automated vehicles 405, and stored in the system database 110b. The artificial intelligence model 411 may be trained on a portion of the training data using a suitable optimization algorithm, such as stochastic gradient descent. The remote server 410a can train the artificial intelligence model 411 by minimizing the calculated loss function by iteratively updating the trainable parameters of the artificial intelligence model 411 (e.g., using backpropagation). The remote server 410a can evaluate the artificial intelligence model 411 on a held-out portion of the training data (e.g., validation set that was not used to train the artificial intelligence model 411) to assess the performance of the artificial intelligence model 411 on unseen data. The evaluation metrics used to assess the model's performance may include, for example, accuracy, precision, recall, and F1 score, among others.

The remote server 410a can train an artificial intelligence model 411 until a training termination condition is met. Some non-limiting training termination conditions include a maximum number of iterations being met or a predetermined performance threshold being met. The performance threshold can be satisfied when the artificial intelligence model 411 reaches a certain level of accuracy, F1 score, precision, recall, or any other relevant metric on a validation set. The remote server 410 can provide the trained artificial intelligence model 411 one or more automated vehicles 405 for which the artificial intelligence model 411 was trained. The automated vehicle(s) 405 can then utilize the artificial intelligence model 411 to detect and classify objects in real-time or near real-time, as described herein.

The remote server 410a can update one or more of the artificial intelligence models 411 (e.g., by retraining, fine-tuning, or other types of training processes) when sequences of images are received from the automated vehicles 405 and utilized to produce additional training data. The remote server 410a (or the autonomy systems of the automated vehicles 405) can generate the additional training data by determining corrections to classifications made by the artificial intelligence model executing on the automated vehicle 405. The corrected classifications and bounding boxes can be utilized as ground truth data for the images in the sequences of images to which they correspond. Although the artificial intelligence models 411 can include neural networks trained using supervised learning techniques, it should be understood that any alternative and/or additional machine learning model(s) may be used to implement similar learning engines.

FIG. 5 is a flow diagram showing automated vehicle operations for a method 500 of detecting traffic lights and determining driving behaviors based on a contemporaneous roadway environment, according to an embodiment. For case of describing and understanding the method 500, the automated vehicle comprises various hardware and software components that define an autonomy system, which includes a controller (or similar processor device) that performing the operational steps of the method 500. Embodiments, however, may include any number of, for example, controllers, processors, computing devices (e.g., servers), or other processing hardware or software components for performing the features and functions described herein.

Moreover, it should be understood that any device or system, with one or more processors, may perform the features or functions of the method 500. A single processing or computing device need not perform each feature or function described with respect to the method 500. In some embodiments, various different processors, servers, or any other computing devices may perform one or more operations. As an example, the controller of the automated vehicle may perform certain operations, whereas a server (e.g., remote server 170) may perform certain other operations. As another example, one or more operations may be performed via a cloud-based service including any number of servers, which may be in communication with the processor of the automated vehicle and/or the autonomy system of the automated vehicle.

Furthermore, the method 500 comprises operations 503-510. However, it should be appreciated that other embodiments may comprise additional or alternative execution steps, or may omit one or more steps altogether. It should also be appreciated that other embodiments may perform certain execution steps in a different order. The operational steps 503-510 discussed herein may also be performed simultaneously or near-simultaneously with one another.

In operation 502, one or more perception sensors (e.g., cameras) receive image data containing imagery including one or more traffic lights. Each camera captures imagery of a roadway environment within a field-of-view of the particular camera, which the camera translates from analog light waves (e.g., photograph of the imagery) into computer-readable data, thereby generating image data containing the imagery. The roadway environment includes various objects (e.g., vehicles, pedestrians) or roadway features (e.g., lane lines, traffic lights, pedestrian lights) around the automated vehicle that could inform or affect driving behaviors and decisions of the automated vehicle. The image data contains information indicating the presence of the various objects and roadway features of the environment.

Similarly, the automated vehicle includes various types of perception sensors (e.g., cameras, LiDAR devices, radar devices) for generating corresponding types of sensor data (e.g., image data generated by a camera; LiDAR data generated by a LiDAR device; radar data generated by a radar device). The sensor data may indicate the objects or roadway features of the environment within the particular sensor's field-of-view according to capabilities and functionality of the particular type of sensor. As an example, the fields-of-view of both a radar device and a camera captures a traffic light in front of the automated vehicle. Both the radar data and the image data indicate the traffic light and certain characteristics of the traffic light (e.g., positioning relative to the automated vehicle; dimensions of the traffic light). The radar data, however, does not include data for determining a color of the traffic light (e.g., red, yellow, green) or determining which particular light of the traffic light is illuminated (e.g., top, middle, bottom), because the radar data does not include visually-cognizable information, whereas the image data indicates the color of the traffic light or which light of the traffic light is illuminated.

The controller or other components (e.g., processor, autonomy system) of the automated vehicle (or a remote computing device) execute software components performing functions or layers of one or more machine-learning architectures, which define certain operational engines that the automated vehicle applies against the sensor data to generate or infer certain types of data or information about the roadway environment. Non-limiting examples of these engines include computer vision engines, object recognition engines, and traffic light state detection engine, among others. In operation 502, the controller receives or translates the sensor data, received from the various sensors, into a format compatible with the various operational engines.

In operation 504, the controller detects a traffic light in the image data received from a subset of cameras of the one or more cameras by applying an object recognition engine on the image data received from each camera of the one or more of cameras. The automated vehicle comprises any number of cameras, potentially directed in multiple directions around the automated vehicle. Of the plurality of cameras of the automated vehicle, it is possible that not every camera has a field-of-view that would capture imagery of the traffic light. As such, at a given moment, a subset of cameras may generate image data indicating the presence of the traffic light. In the current operation 504, the controller applies the object recognition engine on the image data received from each camera, and the object recognition engine detects the traffic light in the image data received from only the subset of cameras with the field-of-view capturing the traffic light. In some circumstances, the object recognition engine detects the presence of additional objects (e.g., pedestrians) or roadway features (e.g., additional traffic lights, crosswalks) in the roadway environment.

In some embodiments, the controller applies the object recognition engine (or similar operational engine) on other types of sensor data received from other types of perception sensors. In some circumstances, the object recognition engine detects the traffic light in the sensor data from a particular sensor. The object recognition engine may also detect the presence of other objects or other roadway features in the roadway environment. These additionally identified features may referenced downstream, in later operations, for confirming the state of the traffic light or determining a particular driving behavior.

In operation 506, the controller identifies a state of the traffic light by applying a state detection engine on the image data received from each particular camera of the subset of one or more cameras. In some instances, after the object recognition engine detects the presence of one or more traffic lights, the controller then executes software programming of the state detection engine that determines a particular state (e.g., red, yellow, green) of each detected traffic light. For each traffic light detected in the image data from a particular camera, the controller applies the state detection engine on the image data from the particular camera to determine the state of the particular traffic light. The object detection engine or other software programming of the machine-learning architecture determines a region of the image data and outputs processed image data indicating the region of the image data containing the traffic light. For example, the object recognition engine may include a bounding box for the detected traffic light, allowing an object-tracking engine to track and update the related information about the environment. The controller applies the state detection engine on the processed image data and environment information, including the image data having the bounding box around the detected traffic light. The state detection engine identifies the particular state of the detected traffic light based on, for example, determining a particular light of the traffic light is illuminated.

In operation 508, the controller determines a number of matching states identified for each traffic light detected in the image data of each camera in the subset of cameras. The object recognition engine recognizes or detects the presence of one or more traffic lights using the sensor data gathered from one or more sensors. For each detected traffic light, the state detection algorithm (or other software programming of the machine-learning architecture) identifies a state of the traffic light in the image data from each particular camera. The state detection algorithm then compares the identified state of the traffic light across the image data from each of the cameras to confirm the identified state. The state detection engine tabulates the number of matching states from the image data to confirm the identified state of the traffic light.

As an example, in some embodiments, the controller applies an object recognition engine having multiple CNNs trained to recognize or detect a traffic light, and identify and confirm the state of the traffic light, by analyzing image data from a visual spectrum camera. A first CNN is trained to do object detection of the scene and define a bounding box around the recognized traffic light. A second CNN can take as input the region of the image bounded by the box as constituting the traffic light, and "read" the light to identify the state of the traffic light (e.g., red, yellow, green).

As another example, the controller executes the object recognition engine that recognizes a traffic light in the image data received from three cameras. The controller then executes the state detection engine that determines the top light of the traffic light is illuminated and identifies a STOP state (or similar) for the traffic light in the image data of two cameras; and determines the middle light of the traffic light is illuminated and identifies a CAUTION state (or similar) for the traffic light in the image data of the third camera. The state detection algorithm determines that the image data from two cameras indicate two states that match (e.g., two STOP states identified), and that the image data from the third camera indicates one instance of a different state (e.g., one CAUTION state identified). In some embodiments, the state detection algorithm outputs a final, identified state of the traffic light only after a identifying a threshold number of matching states.

The controller executes the objection recognition engine and state detection engine continuously, where the controller applies the objection recognition engine and state detection engine on the image data at a very short, preconfigured time-interval, for any number of discrete temporal points. In some embodiments, the state detection algorithm outputs a final, identified state of the traffic light only after a identifying a threshold number of matching states, across multiple consecutive intervals of applying the objection recognition engine and state detection engine against consecutive intervals of image data.

In some cases, the automated vehicle may be configured for improved accuracy by acquiring and evaluating a greater number of sensor observations (e.g., additional sensor inputs; additional intervals of sensor data) before the controller outputs the final identified state for the traffic light.

In some embodiments, the automated vehicle references and feeds additional or alternative types of data into the object recognition engine or the state detection engine, such as adjacent traffic lights for adjacent lanes, or crosswalk signals (sometimes referred to as "pedestrian traffic lights") of crosswalks parallel to, or in front, of the automated vehicle's lane of travel. The additional information may be observed with different sensors and analyzed separately. As an example, if one camera is used to capture an image of the traffic light for the automated vehicle's current lane, another camera captures another image of, for example, another traffic light of an adjacent lane or for pedestrian light for the crosswalk.

In some embodiments, the state detection engine analyzes only image data containing a recognized traffic light. As an example, if only one camera image is available for two traffic lights, then the object detection engine identifies one or more portions (or regions) of the image that includes each traffic light. The object detection engine (or other software programming) parses the portions of the image such that when the portions are examined/processed by the state detection engine, the state detection engine is only exposed to image data from that one traffic light, not both traffic lights.

In some embodiments, the state detection engine (or other software component of the autonomy system) references additional types of information indicating features of the roadways. For example, the state detection engine determines or references a pedestrian traffic light, the presence of pedestrians in front of the automated vehicle, and the state of adjacent traffic lights of adjacent lanes of travel, among other types of information. In some cases, the state detection engine (or other software component of the autonomy system) detects and references the accelerations and velocities of all traffic around the intersection to help confirm the traffic light state detection. For instance, if all of the vehicles ahead of and before the intersection are decelerating to a stop, the state detection engine may be more likely to determine the state of the traffic light in the direction of travel is yellow or red. In some cases, the state detection engine (or other software component of the autonomy system) detects and references brake lights of vehicles ahead of the ego vehicle to improve estimates of vehicle accelerations and/or confirm the traffic light state detection as red.

The state detection engine (or other software component of the autonomy system) may detect and reference alternative points of reference (e.g., alternative detected objects) to determine the state of the traffic light. For example, if the traffic light for the ego vehicle's current lane is occluded or not observable (e.g., by a large vehicle ahead of the ego vehicle), then the autonomy system detects and references the state of the pedestrian signal of a parallel crosswalk, the state of the traffic light in an adjacent lane, or the velocity and acceleration of other vehicles in the same or adjacent lanes.

In some embodiments, the autonomy system includes the machine-learning architecture having layers that perform machine-learning functions for analyzing various types of information. In some cases, the autonomy system implements a Hidden Markov Model (HMM) to process the information from multiple secondary sources, in addition to processing the information from the primary source for detection of the traffic light state. The HMM could quickly sort out whether the signals from all the sources are consistent with a particular traffic light state. Other approaches for analyzing the data from the different sources are also possible.

In certain circumstances, the state detection engine (or other software component of the autonomy system) determines that the information gathered from various data sources is inconsistent or does not satisfy a state detection threshold. In these circumstances, the autonomy system may determine which information and data source best estimates the traffic light state. The autonomy system may assign weights to the various sources based on known or assumed reliability. For instance, a CNN model that determines the traffic light state from camera data is assumed to be highly accurate. The autonomy system assigns a comparatively high weight to the output of the state detection engine, such that it would take several consistent signals from other sources to overcome the outputs. Weighting might change dynamically depending on circumstances and the surrounding environment. For example, if there is measured or likely glare at the time of the observation of the traffic light, which is known to impact the reliability of the state detection, then the weight of the detection could be reduced to give more weight or reliance on the other sources of information.

In operation 510, the autonomy system generates a driving instruction for the automated vehicle based upon the number of matching states identified for the traffic light. For instance, the autonomy system determines whether to, for example, continue driving, slow down, or stop when the state detection engine confirms the state of the light (e.g., GO, green, STOP, red, CAUTION, yellow).

In some embodiments, the autonomy system detects and references multiple sources of information for determining the driving behavior. For example, using various types of information, the autonomy system may generate an estimate of when the traffic light will next change state. For instance, if the pedestrian traffic light for a parallel crosswalk changes from a "walk" indication to a "don't walk" indication, or starts counting down to a future "don't walk" indication, then the autonomy system may infer that there is a higher probability that the vehicle traffic lights governing vehicle travel lanes travelling parallel to the crosswalk will soon turn from green to red. This extra time can be very valuable for automated vehicles to begin slowing earlier with lower deceleration and therefore reduce the wear on the braking systems.

FIGS. 6A-6E show examples of roadway environments 600a-600e including an intersection 635 ahead of an automated ego vehicle.

Figure 6A:
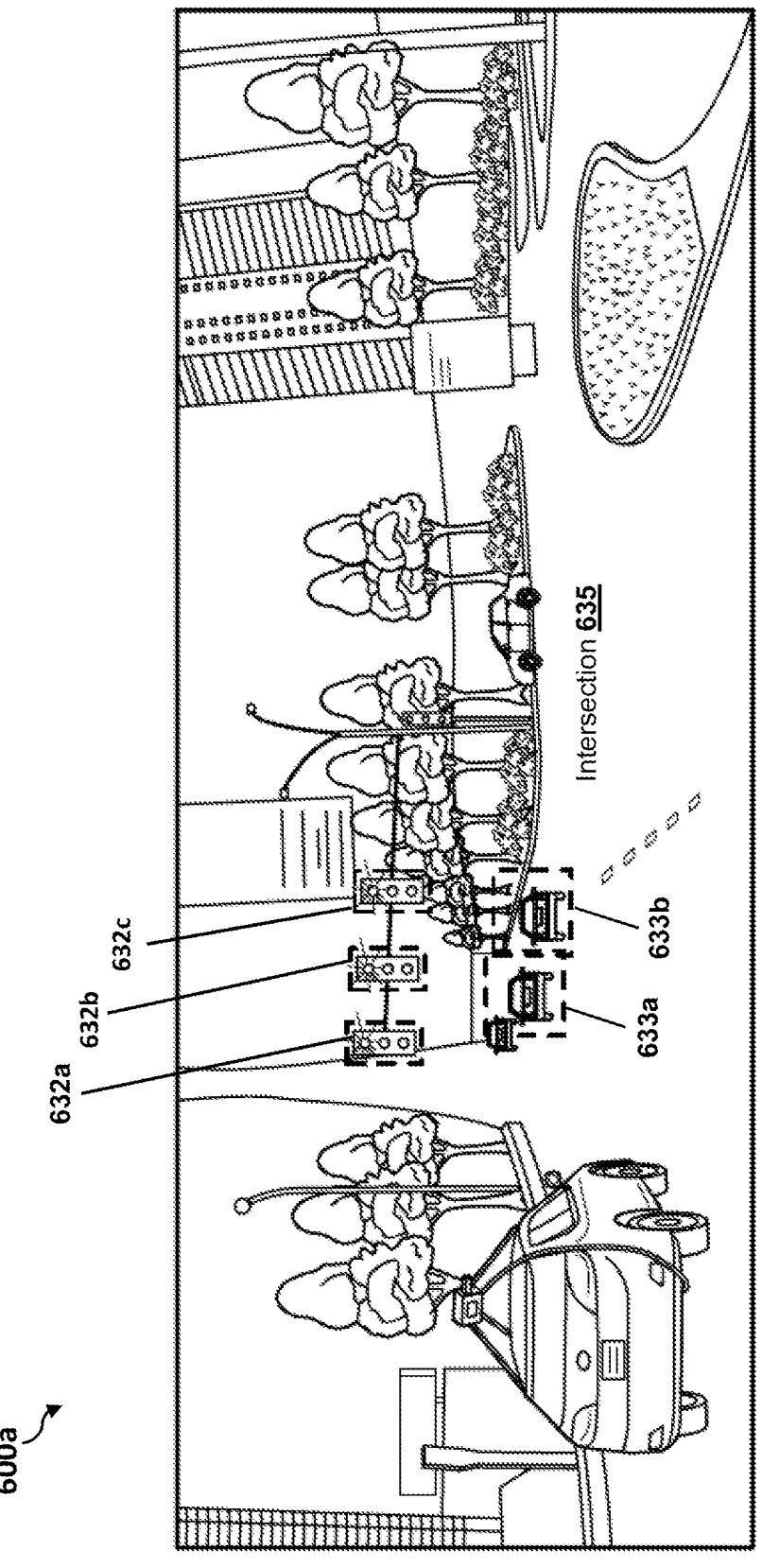
FIGS. 6A-6E show examples of roadway environments including an intersection ahead of an automated ego vehicle.

FIG. 6A shows a roadway environment 600a at an intersection 635, including traffic lights 632a-632c (generally referred to as "traffic lights 632") and other any number of other traffic vehicles 633a-633a (generally referred to as "traffic vehicles 633").

An autonomy system applies an object recognition engine on image data showing the environment 600a. The object recognition engine recognizes and detects the traffic lights 632 and the traffic vehicles 633. The object recognition engine may place bounding boxes around the detected traffic lights 632 and traffic vehicles 633, denoting the portions of the image data containing the detected features. The autonomy system then applies a state detection engine on the image data containing the bounding boxes around the detected traffic lights 632, for each camera feed that captured an image of the traffic lights 632, and for each particular traffic light 632. The state detection engine generates an estimated state of each traffic light 632, for each camera feed, indicating a STOP or red state. The state detection engine counts the number of matching estimated states identified for a given light 632, across each camera feed that detected the particular light 632. The state detection engine may confirm a final identified state for each particular light 632 according to the largest number of matching states or if the number of matching states satisfies a threshold. The autonomy system then generates a driving instruction for the ego vehicle to slow or stop at the intersection 635.

Figure 6B:
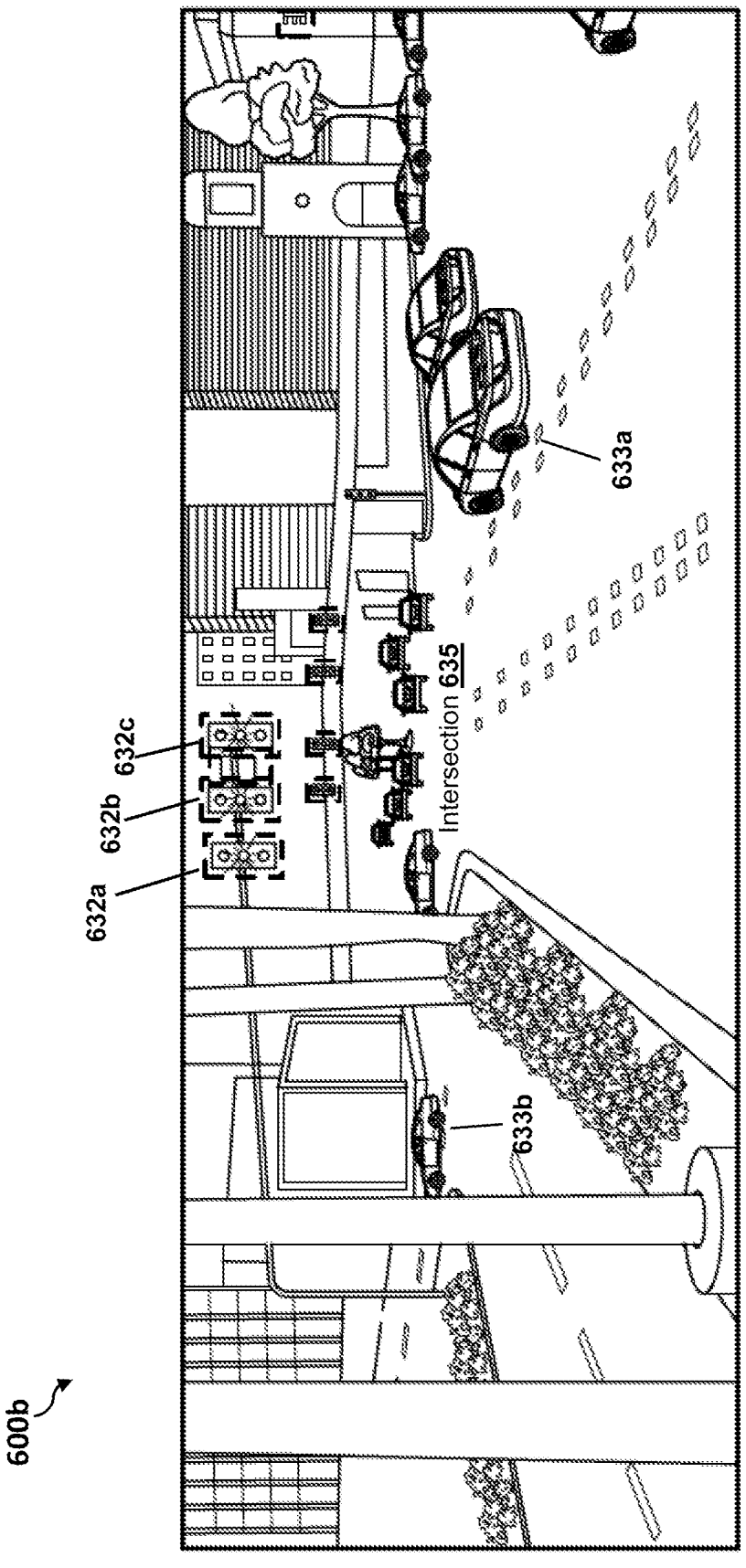

FIG. 6B shows a roadway environment 600b at an intersection 635, including traffic lights 632 and other any number of other traffic vehicles 633, such as traffic vehicles 633a nearby the ego vehicle and traveling in a parallel travel lane, and traffic vehicles 633b driving in the intersection 635.

An autonomy system applies an object recognition engine on image data showing the environment 600b. The object recognition engine recognizes and detects the traffic lights 632 and the traffic vehicles 633. The object recognition engine may place bounding boxes around the detected traffic lights 632, denoting the portions of the image data containing the detected features. The autonomy system then applies a state detection engine on the image data containing the bounding boxes around the detected traffic lights 632, for each camera feed that captured an image of the traffic lights 632, and for each particular traffic light 633. The state detection engine generates an estimated state of each traffic light 632, for each camera feed, indicating a CAUTION or yellow state. The state detection engine counts the number of matching estimated states identified for a given light 632, across each camera feed that detected the particular light 632. The state detection engine may confirm a final identified state for each particular light 632 according to the largest number of matching states or if the number of matching states satisfies a threshold.

The autonomy system then generates a driving instruction according to various factors. As an example, the autonomy system may determine a predicted amount of time until the state of the traffic lights 632 changes to a STOP or red state. Additionally or alternatively, the autonomy system may determine the ego vehicle's distance to the intersection 635 when detecting the CAUTION state. The autonomy system may determine, for example, to proceed through the intersection 635 while maintaining speed if the ego vehicle is nearby the intersection 635 (e.g., driving over the crosswalk 634) when the traffic light 632 turned yellow. The autonomy system may determine, for example, to slow down to stop at the intersection 635 if the distance of the ego vehicle is too far to safely pass through the intersection 635 before the light turns red.

The autonomy system may consider additional sources of information to adjust the weight of information used for determining and confirming the identified state. In some circumstances, this may occur when the autonomy system receives insufficient or contradictory information or as a confirmation check against the outputs of the state detection engine. For instance, the autonomy system may perform a confirmation check and/or adjust weights assigned to data sources based on the behaviors of the traffic vehicles 633. As an example, the autonomy system may raise the relative weight assigned to camera sensor information, or raise a confidence level for the detected state or a determined driving action, when the autonomy system detects deceleration or recognizes brakes lights for the traffic vehicles 633a nearby the ego vehicle and traveling in the parallel travel lane.

Figure 6C:
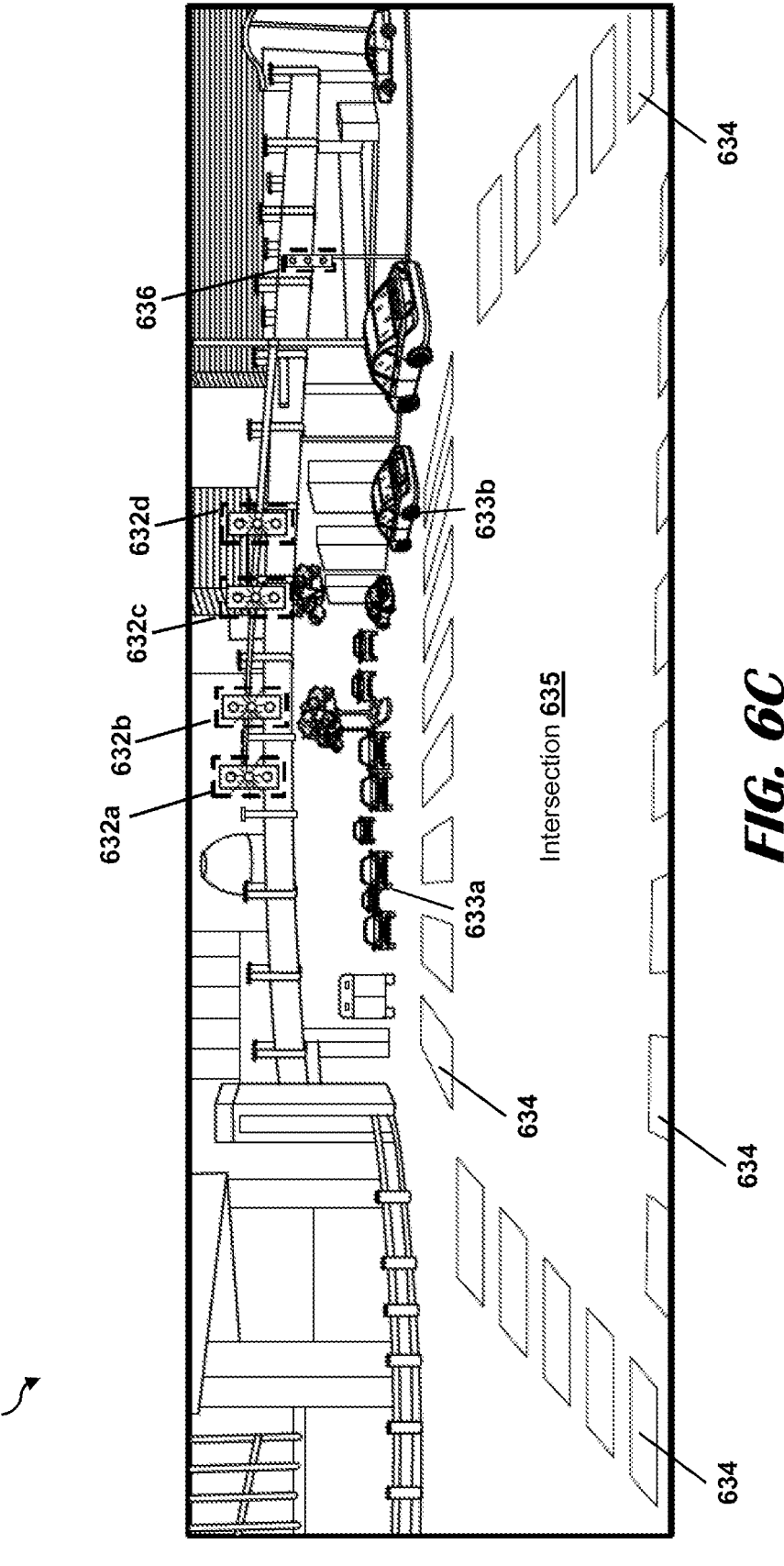

FIG. 6C shows a roadway environment 600c at an intersection 635, including traffic lights 632, a pedestrian light 636, crosswalks 634, and other any number of other traffic vehicles 633, such as traffic vehicles 633a nearby the ego vehicle and traveling in a parallel travel lane, and traffic vehicles in the intersection 635.

An autonomy system applies an object recognition engine on image data showing the environment 600c. The object recognition engine recognizes and detects the traffic lights 632, the pedestrian light 636, and the crosswalks 634. The object recognition engine may place bounding boxes around the detected traffic lights 632 and the pedestrian light 636, denoting the portions of the image data containing the detected features. The autonomy system then applies a state detection engine on the image data containing the bounding boxes around the detected traffic lights 632 and the pedestrian light 636, for each camera feed that captured an image of the traffic lights 632 and the pedestrian light 636, and for each particular traffic light 632. The state detection engine generates an estimated state of each traffic light 632, for each camera feed, indicating a CAUTION or yellow state. The state detection engine counts the number of matching estimated states identified for a given light 632, across each camera feed that detected the particular light 632. The state detection engine may confirm a final identified state for each particular light 632 according to the largest number of matching states or if the number of matching states satisfies a threshold.

The autonomy system then generates a driving instruction according to various factors. As an example, the autonomy system may determine a predicted amount of time until the state of the traffic lights 632 changes to a STOP or red state. Additionally or alternatively, the autonomy system may determine the ego vehicle's distance to the intersection 635 when detecting the CAUTION state. The autonomy system may determine, for example, to proceed through the intersection 635 while maintaining speed if the ego vehicle is nearby the intersection 635 (e.g., driving over the crosswalk 634) when the traffic light 632 turned yellow. The autonomy system may determine, for example, to slow down to stop at the intersection 635 if the distance of the ego vehicle is too far to safely pass through the intersection 635 before the light turns red.

Figure 6D:
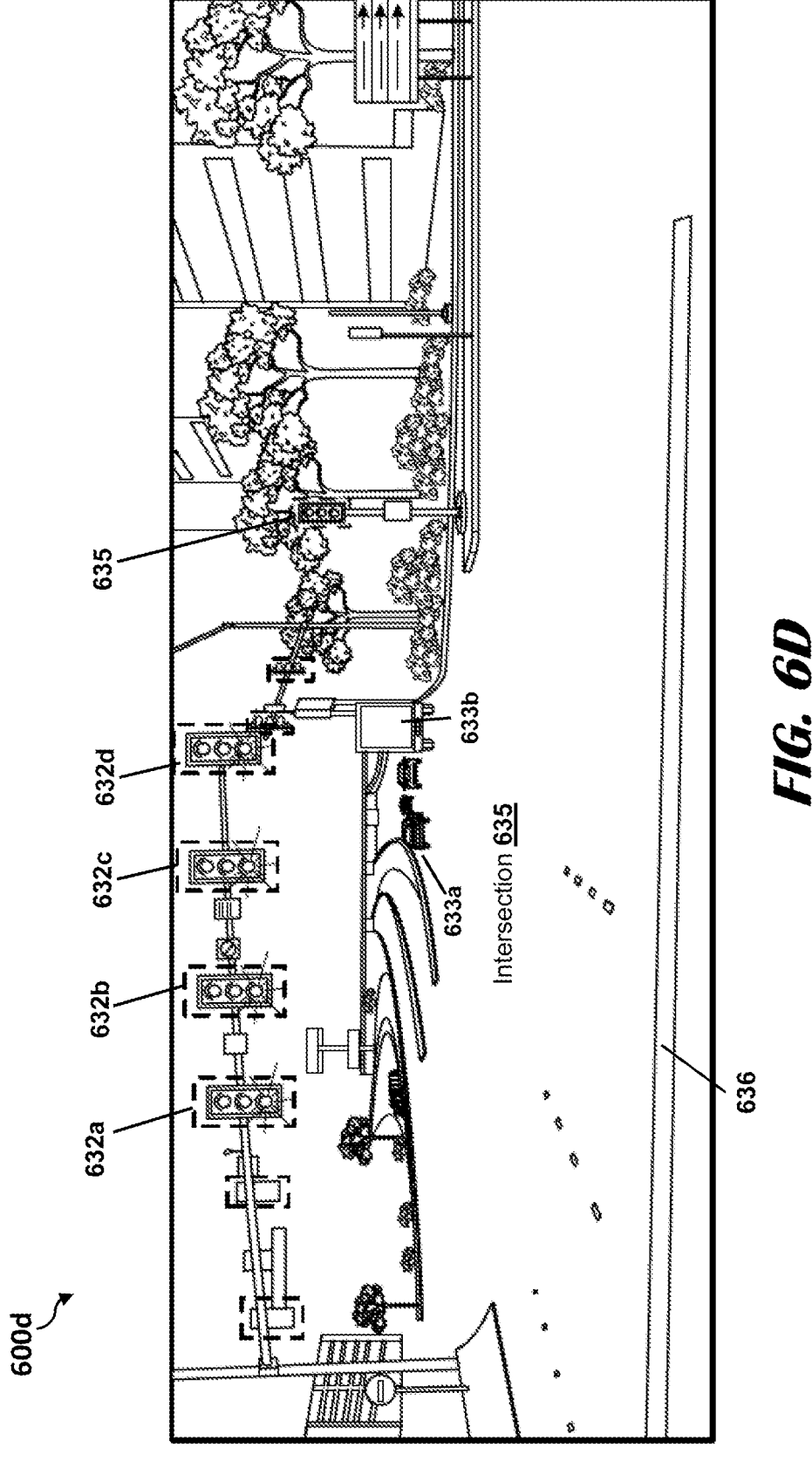

FIG. 6D shows a roadway environment 600d at an intersection 635, including traffic lights 632, a pedestrian light 636, a stop line 636, and other any number of other traffic vehicles 633, such as traffic vehicles 633 traveling in parallel travel lanes on the other side of the intersection 635.

An autonomy system applies an object recognition engine on image data showing the environment 600d. The object recognition engine recognizes and detects the traffic lights 632, the pedestrian light 636, and the stop line 636. The object recognition engine may place bounding boxes around the detected traffic lights 632 and the pedestrian light 636, denoting the portions of the image data containing the detected features. The autonomy system then applies a state detection engine on the image data containing the bounding boxes around the detected traffic lights 632 and the pedestrian light 636, for each camera feed that captured an image of the traffic lights 632 and the pedestrian light 636, and for each particular light 632, 636. The state detection engine generates an estimated state of each traffic light 632, for each camera feed, indicating a PROCEED or green state. The state detection engine counts the number of matching estimated states identified for a given light 632, across each camera feed that detected the particular light 632. The state detection engine may confirm a final identified state for each particular light 632 according to the largest number of matching states or if the number of matching states satisfies a threshold. The autonomy system then generates a driving instruction to proceed through the intersection 635 while maintaining speed.

Figure 6E:
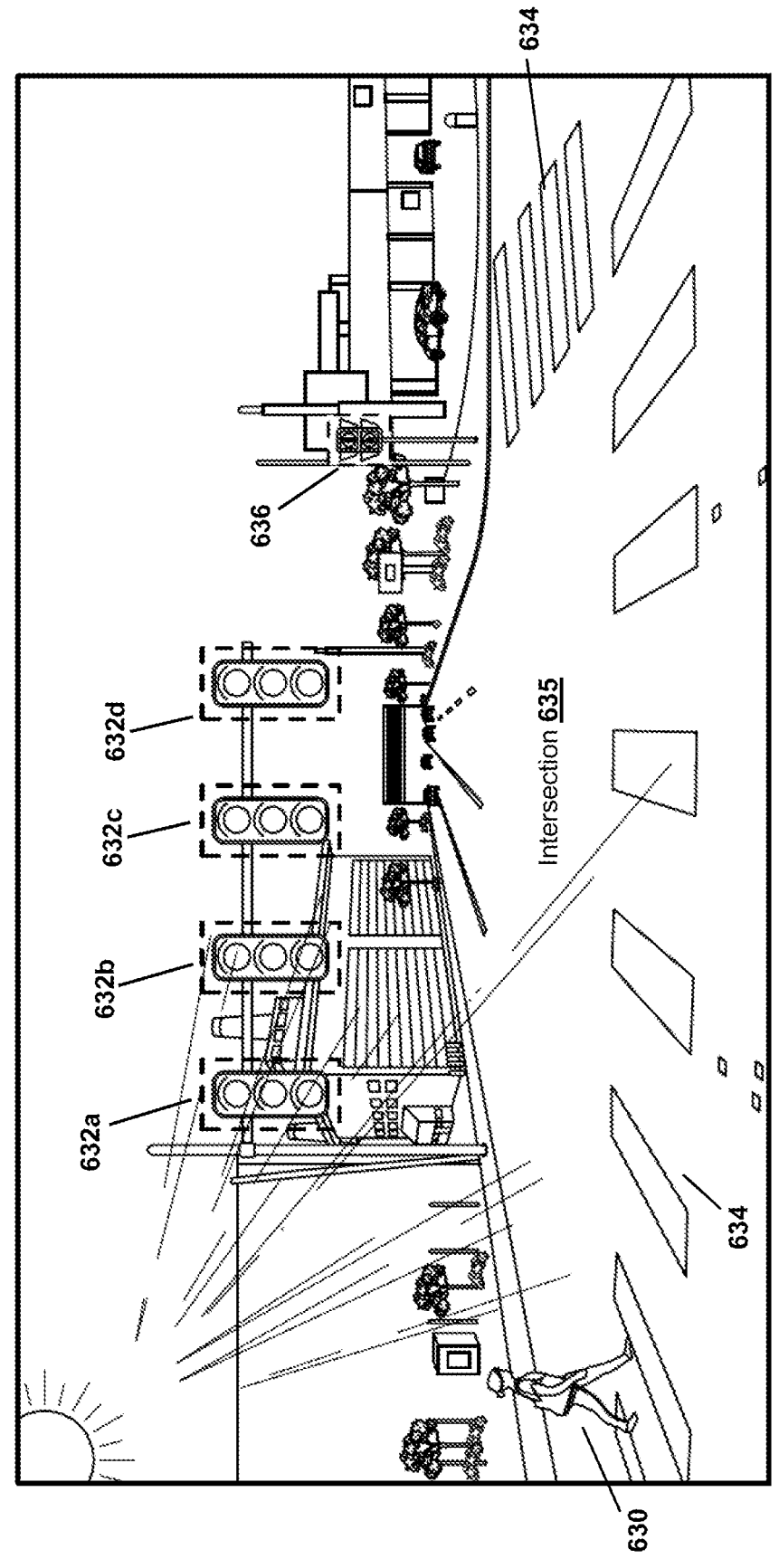

FIG. 6E shows a roadway environment 600e at an intersection 635, including traffic lights 632, a pedestrian light 636, and a crosswalk 634 with a pedestrian 630 entering the intersection 635 in front of the ego vehicle. An autonomy system applies an object recognition engine on image data showing the environment 600e. The object recognition engine recognizes and detects the traffic lights 632, the pedestrian light 636, the crosswalk 634, and the pedestrian 630. The object recognition engine may place bounding boxes around the detected traffic lights 632 and the pedestrian light 636, denoting the portions of the image data containing the detected features. The autonomy system then applies a state detection engine on the image data containing the bounding boxes around the detected traffic lights 632 and the pedestrian light 636, for each camera feed that captured an image of the traffic lights 632 and the pedestrian light 636, and for each particular traffic light 632, 636. The state detection engine generates an estimated state of each light 632, 636, for each camera feed. The state detection engine counts the number of matching estimated states identified for a given light 632, 636, across each camera feed that detected the particular light 632, 636. The state detection engine may confirm a final identified state for each particular light 632, 636 according to the largest number of matching states or if the number of matching states satisfies a threshold.

The autonomy system may consider additional sources of information to adjust the weight of information used for determining and confirming the identified state. In some circumstances, this may occur when the autonomy system receives insufficient or contradictory information or as a confirmation check against the outputs of the state detection engine. As an example, the autonomy system may perform a confirmation check and/or adjust weights assigned to data sources when the autonomy system recognizes a pedestrian 630 walking in front of the ego vehicle in the crosswalk 634. As another example, the autonomy system may lower the relative weight assigned to camera sensor information when the autonomy system detects a glare from the Sun that washes or dilutes the visual perception of the traffic light 632.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for detecting traffic lights, comprising:
receiving, by a processor of an autonomous vehicle from at least two cameras of the autonomous vehicle, image data for imagery including one or more traffic lights;

detecting, by the processor, a traffic light in the image data of the at least two cameras by applying an object recognition engine on the image data received from each camera;
for each camera of the at least two cameras, identifying, by the processor applying a state detection engine, a state of the traffic light for the image data received from the particular camera;
determining, by the processor, a number of matching states identified for the traffic light detected in the image data of each camera in the at least two cameras;
determining, by the processor, the state of the traffic light by adjusting weights to information from different data sources including i) the number of matching states and ii) information indicating the state of the traffic light from sources other than the at least two cameras; and
generating, by the processor, a driving instruction for the autonomous vehicle based upon the determined state of the traffic light.

2. The method according to claim 1, wherein generating the driving instruction for the autonomous vehicle further includes:
detecting, by the processor, a pedestrian traffic light;
identifying, by the processor, a state for the pedestrian traffic light; and
adjusting, by the processor, a weighted value of the driving instruction determination engine based upon the state identified for the pedestrian traffic light.

3. The method according to claim 1, wherein the object recognition engine detects the traffic light according to an object classification model.

4. The method according to claim 1, further comprising:
detecting, by the processor, a traffic vehicle in an adjacent travel lane; and
adjusting, by the processor, a weighted value of the driving instruction determination engine based upon at least one of a deceleration action or a brake light action of the traffic vehicle.

5. The method according to claim 1, further comprising:
detecting, by the processor, a glare in the image data from at least one camera; and
adjusting, by the processor, a weighted value of the state detection engine based upon the detection of a glare in the image data from at least one camera.

6. The method according to claim 1, further comprising:
detecting, by the processor, an object in the image data from the one or more cameras; and
adjusting, by the processor, a weighted value of the driving instruction determination engine based upon a feature of the object detected in the image data.

7. A method for detecting traffic lights, comprising:
receiving, by a processor of an autonomous vehicle from at least two cameras of the autonomous vehicle, image data for imagery including one or more traffic lights;
detecting, by the processor, a traffic light in the image data of the at least two cameras by applying an object recognition engine on the image data received from each camera;
for each camera of the at least two cameras, identifying, by the processor, a state of the traffic light by applying a state detection engine on the image data received from the particular camera;
determining, by the processor, a number of matching states identified for the traffic light detected in the image data of each camera in the at least two cameras;

in response to the states of the traffic light for the at least two cameras not matching, applying, by the processor, a weighting to the state of the traffic light identified for each camera; and generating, by the processor, an input to a vehicle control module for the autonomous vehicle based upon a weighted comparison of the states identified for the traffic light from the at least two cameras.

8. The method according to claim 7, wherein generating the input further includes:

detecting, by the processor, a pedestrian traffic light;

identifying, by the processor, a state for the pedestrian traffic light; and adjusting, by the processor, a weighted value of the driving instruction determination engine based upon the state identified for the pedestrian traffic light.

9. The method according to claim 7, further comprising detecting the traffic light according to an object classification model.

10. The method according to claim 7, further comprising:

detecting, by the processor, a traffic vehicle in an adjacent travel lane; and adjusting, by the processor, a weighted value of the driving instruction determination engine based upon at least one of a deceleration action or a brake light action of the traffic vehicle.

11. The method according to claim 7, further comprising:

detecting, by the processor, a glare in the image data from at least one camera; and adjusting, by the processor, a weighted value of the state detection engine based upon the detection of a glare in the image data from at least one camera.

12. The method according to claim 7, further comprising:

detecting, by the processor, an object in the image data from the one or more cameras; and adjusting, by the processor, a weighted value of the driving instruction determination engine based upon a feature of the object detected in the image data.

13. A system for detecting traffic lights, comprising:

a computer comprising a non-transitory computer-readable memory containing instructions that are configured to be executed by at least one processor to:

receive, from at least two cameras of an autonomous vehicle, image data for imagery including one or more traffic lights;

detect a traffic light in the image data of the at least two cameras by applying an object recognition engine on the image data received from each camera;

for each camera of the at least two cameras, identify, applying a state detection engine, a state of the traffic light for the image data received from the particular camera;

determine a number of matching states identified for the traffic light detected in the image data of each camera in the at least two cameras;

in response to the states of the traffic light for the at least two cameras not matching, applying a weighting to the state of the traffic light identified for each camera; and generate an input to a vehicle control module for the autonomous vehicle based upon a weighted comparison of the states identified for the traffic light from the at least two cameras.

14. The system according to claim 13, wherein generating the input further includes:

detecting a pedestrian traffic light;

identifying a state for the pedestrian traffic light; and adjusting a weighted value of the driving instruction determination engine based upon the state identified for the pedestrian traffic light.

15. The system according to claim 13, wherein the object recognition engine detects the traffic light according to an object classification model.

16. The system according to claim 13, instructions that are configured to be executed by at least one processor to:

detect a traffic vehicle in an adjacent travel lane; and adjust a weighted value of the driving instruction determination engine based upon at least one of a deceleration action or a brake light action of the traffic vehicle.

17. The system according to claim 13, instructions that are configured to be executed by at least one processor to:

detect a glare in the image data from at least one camera; and adjust a weighted value of the state detection engine based upon the detection of a glare in the image data from at least one camera.

18. The system according to claim 13, instructions that are configured to be executed by at least one processor to:

detect an object in the image data from the one or more cameras; and adjust a weighted value of the driving instruction determination engine based upon a feature of the object detected in the image data.

19. The method according to claim 1, further comprising:

receiving, from a data source, additional image data for imagery including the one or more traffic lights;

determining that the received image data and the received additional image data do not satisfy a state detection threshold; and adjusting a weighted value associated with the data source.

20. The system according to claim 13, further comprising instructions that are configured to be executed by at least one processor to:

receive, from a data source, additional image data for imagery including the one or more traffic lights;

determine that the received image data and the received additional image data do not satisfy a state detection threshold; and adjust a weighted value associated with the data source.

\* \* \* \* \*